(No Model.)
J. C. WOOD.
CAR STARTER.
No. 304,393.    Patented Sept. 2, 1884.
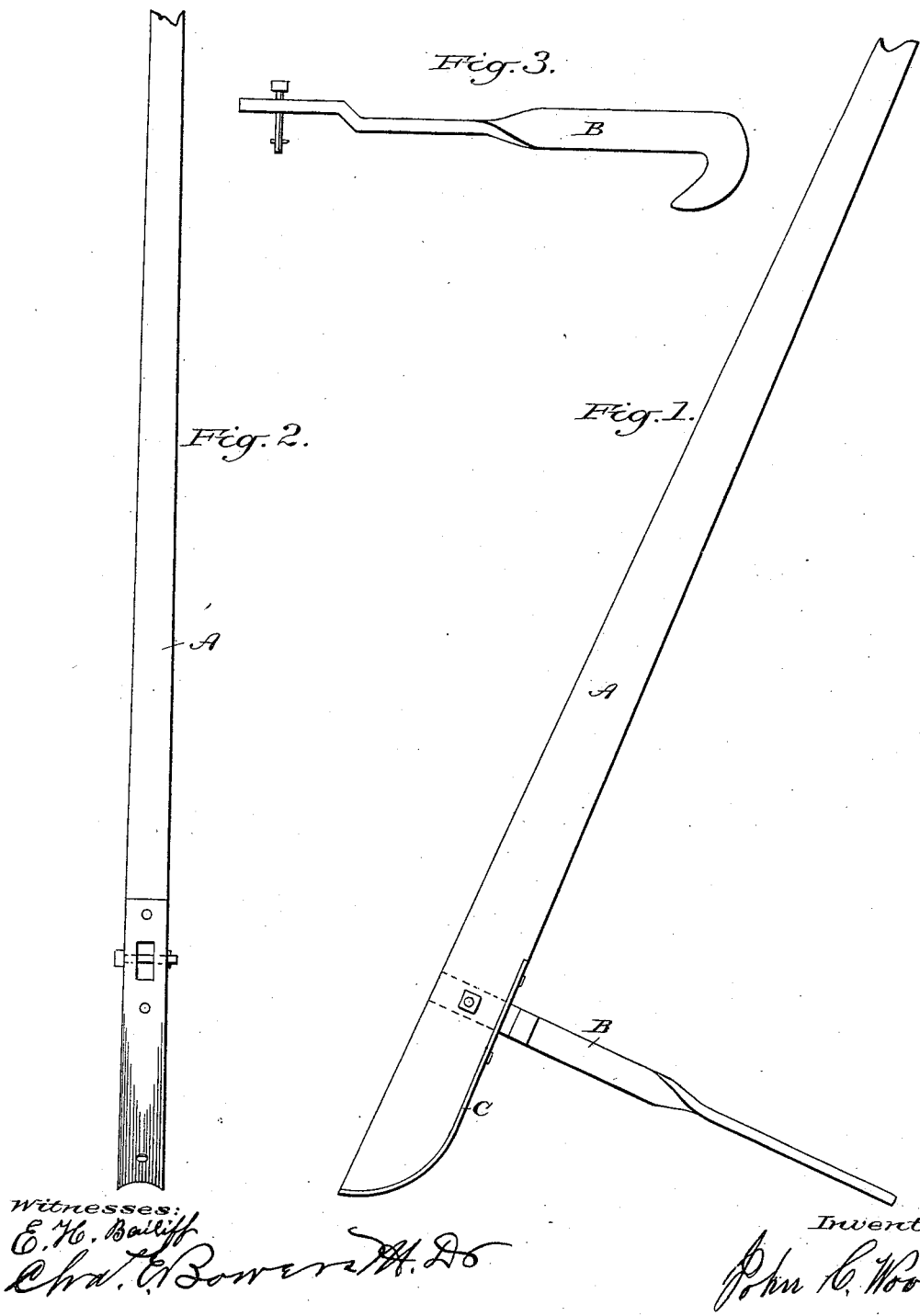
Witnesses:
E. H. Bailiff
Chas. E. Bowers
Inventor:
John C. Wood

UNITED STATES PATENT OFFICE.

JOHN C. WOOD, OF ROBINSON, KANSAS.

CAR-STARTER.

SPECIFICATION forming part of Letters Patent No. 304,393, dated September 2, 1884.

Application filed March 13, 1884. (No model.)

*To all whom it may concern:*

Be it known that I, J. C. WOOD, a citizen of the United States, residing at Robinson, in the county of Brown and State of Kansas, have invented a new and useful Car Starter and Propeller, of which the following is a specification.

My invention is a car starter and propeller on the cant-hook principle. The object is to render it possible for one man to start and propel a loaded car with comparative ease and rapidity, where it would otherwise require from six to eight men to accomplish the same.

My car-starter consists of a lever, hook, and plate.

Figure 1 represents the hook and lever; Fig. 2, the lever provided with plate; Fig. 3, the hook.

In the drawings, A represents the lever; B, the hook, and C the plate.

The lever A is four and one-half feet long. The short arm is grooved to fit on the flange of the car-wheel on which it rests.

The iron hook B with steel point is bent at the lever in order to allow it to drop directly down the inner side of the car-wheel. The hook is also bent at the extremity at a right angle with the lever and rest of the hook, in order to catch the spokes of the wheel.

The plate C is a piece of iron, which is fastened to the lever with screws, the hook passing through it, and hollowed to fit the groove of the short arm of the lever, and is used as the bearing, which rests on the flange of the car-wheel when in use, and by repeatedly catching the hook against the spokes of the car-wheel and lifting the car is propelled, and, by turning the lever over with the hook up and catching hold of the opposite wheel, can be moved toward the operator; and, further, by removing the pin and turning the hook around the lever can be used right or left handed.

What I claim, and desire to secure by Letters Patent, is—

In a car-starter, the combination of lever A, provided with plate C, with the hook B, substantially as shown and described.

JOHN C. WOOD.

Witnesses:
E. H. BAILIFF,
C. E. BOWERS.